(12) United States Patent
Yan et al.

(10) Patent No.: US 11,249,005 B2
(45) Date of Patent: Feb. 15, 2022

(54) METHOD AND SYSTEM FOR DETERMINING FLUORESCENCE INTENSITY OF FLUORESCENCE IMAGE

(71) Applicant: Shanghai Ruiyu Biotech Co., Ltd., Shanghai (CN)

(72) Inventors: Haibo Yan, Shanghai (CN); Haiqing Huang, Shanghai (CN); Puwen Luo, Shanghai (CN)

(73) Assignee: Shanghai Ruiyu Biotech Co., Ltd., Shanghai (CN)

( * ) Notice: Subject to any disclaimer, the term of this patent is extended or adjusted under 35 U.S.C. 154(b) by 275 days.

(21) Appl. No.: 16/629,400

(22) PCT Filed: Jul. 11, 2018

(86) PCT No.: PCT/CN2018/095239
§ 371 (c)(1),
(2) Date: Jan. 8, 2020

(87) PCT Pub. No.: WO2019/015514
PCT Pub. Date: Jan. 24, 2019

(65) Prior Publication Data
US 2020/0141856 A1 May 7, 2020

(30) Foreign Application Priority Data
Jul. 20, 2017 (CN) .......................... 201710596449.2

(51) Int. Cl.
*G06K 9/00* (2006.01)
*G01N 15/14* (2006.01)
(52) U.S. Cl.
CPC ..... *G01N 15/1431* (2013.01); *G01N 15/1463* (2013.01)

(58) Field of Classification Search
CPC .......... G01N 15/1431; G01N 15/1463; G01N 2015/144; G01N 2015/1493; G01N 15/1434; G06K 9/00127
See application file for complete search history.

(56) References Cited

U.S. PATENT DOCUMENTS

2003/0204379 A1* 10/2003 Olschewski ............ G01J 3/443
702/189
2014/0229955 A1* 8/2014 Holmes ................. G06F 9/4881
718/102
(Continued)

FOREIGN PATENT DOCUMENTS

CN 104266956 A 1/2015
CN 105092550 A 11/2015
(Continued)

OTHER PUBLICATIONS

Robert et al. "Statistical Evaluation of Confocal Microscopy Images", Reproductive Toxicity Division, National Health and Environmental Effects Research Laboratory, U.S. Environmental Protection Agency, Cytometry 44, 2001, p. 295-308. (Year: 2001).*
(Continued)

*Primary Examiner* — David P Porta
*Assistant Examiner* — Mamadou Faye
(74) *Attorney, Agent, or Firm* — RatnerPrestia

(57) ABSTRACT

A method and a system for fluorescence intensity of a fluorescence image are provided. In the method, fluorescence imaging is performed on a target sample to obtain a fluorescent image. Edge extraction and segmentation is performed on each detection target in the fluorescence image, to obtain the fluorescent image area of each detection target in the fluorescence image. At least one of a cumulative gray-scale value, a maximum gray-scale value and an average gray-scale value of the fluorescence image region and a diameter value of a bright field image region of each (Continued)

detected target is calculated. Then, the flow clustering analysis is calculated based on at least one of the cumulative grayscale value, the maximum grayscale value, the average grayscale value, and the bright field diameter value.

10 Claims, 5 Drawing Sheets

(56) References Cited

U.S. PATENT DOCUMENTS

| | | |
|---|---|---|
| 2015/0024385 A1 | 1/2015 | Parrish |
| 2018/0188178 A1 | 7/2018 | Luo et al. |

FOREIGN PATENT DOCUMENTS

| | | |
|---|---|---|
| CN | 105928921 A | 9/2016 |
| CN | 107356515 A | 11/2017 |
| EP | 3054279 A1 | 8/2016 |

OTHER PUBLICATIONS

International Search Report issued in PCT/CN2018/095239, dated Sep. 26, 2018, 6 pages.

Yang et al., "An Image Analysis Method for Acquiring Cell's Immunological Information," Journal of Software, vol. 16, No. 9, pp. 1551-1559, English Abstract.

Jia et al., "Reversion of multidrug resistance in leukemia K562 cells by RNA interference targeting Apollon gene," China Oncology 2013, vol. 23, No. 9, pp. 713-720. English Abstract.

Ronneberger, O. et al., "Spatial quantitative analysis of fluorescently labeled nuclear structures: Problems, methods, pitfalls," May 8, 2008, vol. 16(3), pp. 523-562, XP019601640, Chromosome Research, Kluwer Academic Publishers, DO.

Buggenthin F. et al., "An automatic method for robust and fast cell detection in bright field images from high-throughput microscopy," Oct. 4, 2013, vol. 14(1), pp. 1-12, BMC Bioinformatics, Biomed Central, London, GB.

Extended European Search Report for European Application No. 18 835 191.0, dated Mar. 19, 2021, 13 pages.

\* cited by examiner

METHOD AND SYSTEM FOR DETERMINING FLUORESCENCE INTENSITY OF FLUORESCENCE IMAGE

The present application is the national phase of International Patent Application No. PCT/CN2018/095239, titled "METHOD AND SYSTEM FOR DETERMINING FLUORESCENCE INTENSITY OF FLUORESCENCE IMAGE", filed on Jul. 11, 2018, which claims the priority to Chinese Patent Application No. 201710596449.2, titled "METHOD AND SYSTEM FOR DETERMINING FLUORESCENCE INTENSITY OF FLUORESCENCE IMAGE", filed on Jul. 20, 2017 with the Chinese Patent Office, both of which are incorporated herein by reference in their entireties.

FIELD

The present disclosure relates to the technical field of cell detection, and in particular to a method and a system for determining fluorescence intensity of a fluorescence image.

BACKGROUND

Flow cytometry analysis is an important cell analysis technology, the core principle of which is to count fluorescence intensities of to-be-detected targets (cells or other detection particles) to perform clustering analysis. Fluorescence intensity is represented by a recorded voltage pulse value of a fluorescent signal in flow cytometry analysis. At present, with the development of fluorescence microscopic imaging technology and intelligent recognition technology, clustering analysis based on fluorescence imaging technology is realized by performing fluorescence imaging on a large number of to-be-detected targets and analyzing the obtained fluorescence image with an image recognition method. The flow clustering analysis method based on microscopic imaging analysis (image-based quasi-flow analysis method) is a newly developed analysis method.

However, fluorescence intensity is represented by pixels and grayscales in the image analysis based on fluorescence microscopic imaging and intelligent recognition, which is completely different from the fluorescence intensity represented by a voltage pulse value in the flow cytometry analysis. It is important but difficult in the image-based quasi-flow analysis method, to establish a mapping relationship between the fluorescence intensity representation used in the image analysis and the fluorescence intensity representation used in the flow cytometry analysis, to make the two fluorescence intensity representations comparable and ensure the accuracy of a quasi-flow analysis result.

SUMMARY

A method and a system for determining fluorescence intensity of a fluorescence image are provided according to embodiments of the present disclosure, to make fluorescence intensity representation used in the image analysis and fluorescence intensity representation used in the flow cytometry analysis comparable.

In order to achieve the above objective, technical solutions as stated in the claims are provided according to the embodiments of the present disclosure.

Based on the above technical solutions, in the method and the system for determining fluorescence intensity of a fluorescence image according to the embodiments of the present disclosure, fluorescence imaging is performed by a fluorescence microscopic imaging system on a target sample to obtain a fluorescent image. Edge extraction and segmentation is performed on each detection target in the fluorescence image to obtain the fluorescent image area of each detection target in the fluorescence image. A cumulative grayscale value, a maximum grayscale value, and an average grayscale value of the fluorescent image area of each detection target are calculated, and a diameter value of a bright field image area of each detection target is calculated. Then flow clustering analysis is performed based on the cumulative grayscale value, the maximum grayscale value, the average grayscale value, and the bright field diameter value. The value may be inputted to software for flow clustering analysis for analysis, to obtain an analysis result comparable with that obtained by using the flow cytometry analysis.

BRIEF DESCRIPTION OF THE DRAWINGS

In order to explain more clearly the technical solutions of the embodiments of the present disclosure or the conventional art, the following is a brief introduction to the accompanying drawings used in the description of the embodiments or the conventional art. Apparently, the drawings described below are only some embodiments of the present disclosure, and for those skilled in the field, other drawings can be obtained from these drawings without any creative effort.

DETAILED DESCRIPTION OF EMBODIMENTS

Figure 1:
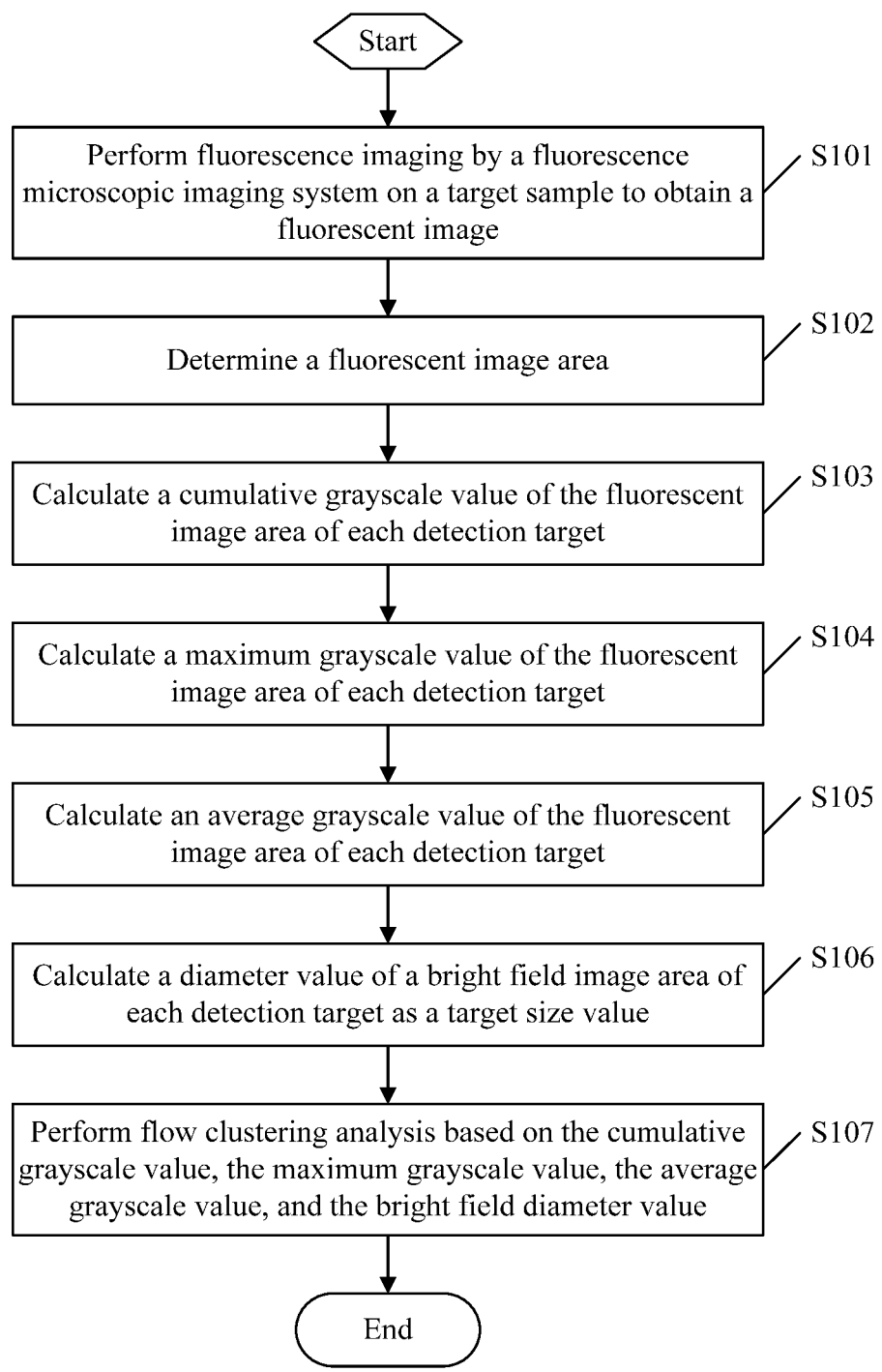
FIG. 1 is a flow chart of a method for determining fluorescence intensity of a fluorescence image according to an embodiment of the present disclosure.

The following is a clear and complete description of the technical solutions of the present disclosure with reference to the accompanying drawings in the present disclosure. Apparently, the described embodiments are only some rather than all of the embodiments of the present disclosure. Based on the embodiments of the present disclosure, all other embodiments obtained by the skilled in the art without any creative effort fall within the scope of the present disclosure.

In practical applications, the flow cytometry analysis can be used to provide multiple indexes for a user to choose, as so to analyze target cells from different sides. The indexes mainly include:

1. a cumulative fluorescence intensity, represented by a cumulative voltage pulse value acquired in a side fluorescence channel when a cell passes;

2. a maximum fluorescence intensity, represented by a maximum voltage pulse value acquired in the side fluorescence channel when a cell passes;

3. an average fluorescence intensity, represented by an average voltage pulse value acquired in the side fluorescence channel when a cell passes; and 4. a target size value, represented by a voltage pulse value acquired in a forward scattering channel when a cell passes.

In cell fluorescence image analysis, after performing edge extraction and segmentation on a fluorescence image of target cells, dozens of feature indexes of the cells can be analyzed and counted, including a fluorescent pixel area, a fluorescence image diameter, a fluorescence image long axis, a fluorescence image short axis, a fluorescence image perimeter, a fluorescence image roundness, a fluorescence image maximum grayscale value, a minimum grayscale value, an average grayscale value, a cumulative grayscale value, a median grayscale value, a grayscale drop value (the maximum grayscale value minus the minimum grayscale value), and the like.

Although a large number of image feature indexes are extracted by performing cell fluorescence image analysis, it is unknown in the existing image analysis methods that which feature indexes correspond to the cumulative voltage pulse value, height, and width in the flow cytometry analysis, so that the statistical analysis data of the feature indexes can be used to obtain a result and an accuracy comparable to those of the flow cytometry analysis. This problem results in a gap between the result of the image analysis method and the result of the flow cytometry analysis method.

In respect to the above problem, four indexes corresponding to the fluorescence intensities in flow cytometry analysis are found by the inventor through a large number of experiments. Specifically, a cumulative fluorescence grayscale value corresponds to the cumulative voltage pulse value of the fluorescent channel in the flow cytometry analysis, an in-cell highest fluorescence grayscale value corresponds to the maximum voltage pulse value of the fluorescence channel in the flow cytometry analysis, an in-cell average fluorescence grayscale value corresponds to the average voltage pulse value of the fluorescence channel in the flow cytometry analysis, and an in-cell bright field diameter corresponds to the voltage pulse value acquired in the forward scattering channel in the flow cytometry analysis.

To solve the problem that a user cannot determine the accuracy of the detection result because the fluorescence intensity representation used in the image analysis is not comparable with the fluorescence intensity representation used in the flow cytometry analysis in the conventional art, a method for determining fluorescence intensity of a fluorescence image based on the above four mapping relationships is provided according to the present disclosure. Referring to FIG. 1, the method includes the following steps S101 to S107.

In step S101, fluorescence imaging is performed by a fluorescence microscopic imaging system on a target sample to obtain a fluorescent image.

In this step, image-based quasi-flow fluorescence detection is performed by the fluorescence microscopic imaging system on the target sample to obtain the fluorescence image of the target sample.

In step S102, a fluorescent image area is determined.

After obtaining the fluorescent image of the target sample, image processing and analysis may be performed on the fluorescence image by an intelligent recognition system to obtain a fluorescent image area of each cell (detection target) included in the fluorescent image. Specifically, in the process of image processing and analysis, edge extraction and segmentation is performed on each detection target in the fluorescence image to obtain the fluorescent image area of each detection target in the fluorescence image.

In step S103, a cumulative grayscale value of the fluorescent image area of each detection target is calculated.

In this step, based on the range of the obtained fluorescent image area of each detection target, a cumulative grayscale value of the fluorescent image area of each detection target is calculated by using the image recognition technology, and is determined as a cumulative fluorescence intensity value represented by a cumulative voltage pulse value acquired by a photomultiplier tube in a fluorescent channel in flow clustering analysis. The cumulative fluorescence grayscale value is a sum of grayscale values of all pixels in the fluorescent image area of a detection target.

In step S104, a maximum grayscale value of the fluorescent image area of each detection target is calculated.

In this step, based on the range of the obtained fluorescent image area of each detection target, a maximum grayscale value of the fluorescent image area of each detection target is calculated by using the image recognition technology, and is determined as a maximum fluorescence intensity value represented by a maximum voltage pulse value acquired by the photomultiplier tube in the fluorescent channel in the flow clustering analysis. The maximum grayscale value is the greatest grayscale value of pixels in the fluorescent image area of the detection target.

In step S105, an average grayscale value of the fluorescent image area of each detection target is calculated.

In this step, based on the range of the obtained fluorescent image area of each detection target, an average grayscale value of the fluorescent image area of each detection target is calculated by using the image recognition technology, and is determined as an average fluorescence intensity value represented by an average voltage pulse value acquired by the photomultiplier tube in the fluorescent channel in the flow clustering analysis. The average grayscale value is an average value of grayscale values of all pixels in the fluorescent image area of the detection target.

In step S106, a diameter value of a bright field image area of each detection target is calculated as a target size value.

In this step, a bright field image of each detection target is obtained, and data analysis is performed on the bright field image. A diameter value of a bright field image area of each detection target is calculated as a target size value, and the target size value is determined as a substitutive index value for a detection target size value represented by a voltage pulse value acquired by the photomultiplier tube in a forward scattering channel in the flow clustering analysis.

The sequence of steps S103 to S106 in the method may be adjusted according to the requirements of users.

In step S107, the flow clustering analysis is performed based on the cumulative grayscale value, the maximum grayscale value, the average grayscale value, and the bright field diameter value.

In this step, the cumulative grayscale value is used as a cumulative fluorescence intensity value, the maximum grayscale value is used as a maximum fluorescence intensity value, the average grayscale value is used as an average fluorescence intensity value, and the diameter value of a bright field image area is used as a detection target size value. Flow clustering analysis is performed based on the cumulative grayscale value, the maximum grayscale value, the average grayscale value, and the bright field diameter value, to generate a fluorescence detection waveform corresponding to at least one of the cumulative grayscale value, the maximum grayscale value, the average grayscale value, and the bright field diameter value. The generated fluorescence detection waveform may be directly compared with a fluorescence detection waveform obtained by conventional flow cytometry analysis. Based on the comparison result, the detection target size value in the flow clustering analysis may be adjusted, and weight values are added for the cumulative grayscale value, the maximum grayscale value, the average grayscale value, and the bright field diameter value, so that the result of the flow clustering analysis is closer to the fluorescence detection waveform obtained by the existing flow cytometry analysis, improving the accuracy of the detection result.

Specifically, with the method according to the embodiment of the present disclosure, flow cytometry analysis can be performed with a high accuracy on the detection target, without using a photomultiplier tube to acquire the cumulative voltage pulse value, the maximum voltage pulse value, the average voltage pulse value, and the detection target size value of the detection target.

In the embodiment of the present disclosure, when performing flow clustering analysis based on the cumulative grayscale value, the maximum grayscale value, the average grayscale value, and the bright field diameter value, the flow clustering analysis may be directly performed based on the cumulative grayscale value, the maximum grayscale value, the average grayscale value, and the bright field diameter value. Before using the cumulative grayscale value, the maximum grayscale value, the average grayscale value, and the bright field diameter value to perform flow clustering analysis, it is required to train an equation in flow clustering analysis to adjust weight values in the equation to improve the accuracy of the calculation result. In this step, the cumulative fluorescence intensity value, the maximum fluorescence intensity value, the average fluorescence intensity value, and the fluorescence area value respectively corresponding to the cumulative grayscale value, the maximum grayscale value, the average grayscale value, and the bright field diameter value, may be determined according to a predetermined mapping table. The mapping table stores predetermined mapping relationships between the cumulative grayscale value and the cumulative fluorescence intensity value, between the maximum grayscale value and the maximum fluorescence intensity value, between the average grayscale value and the average fluorescence intensity value, and between the bright field diameter value and the fluorescence area value.

Figure 2:
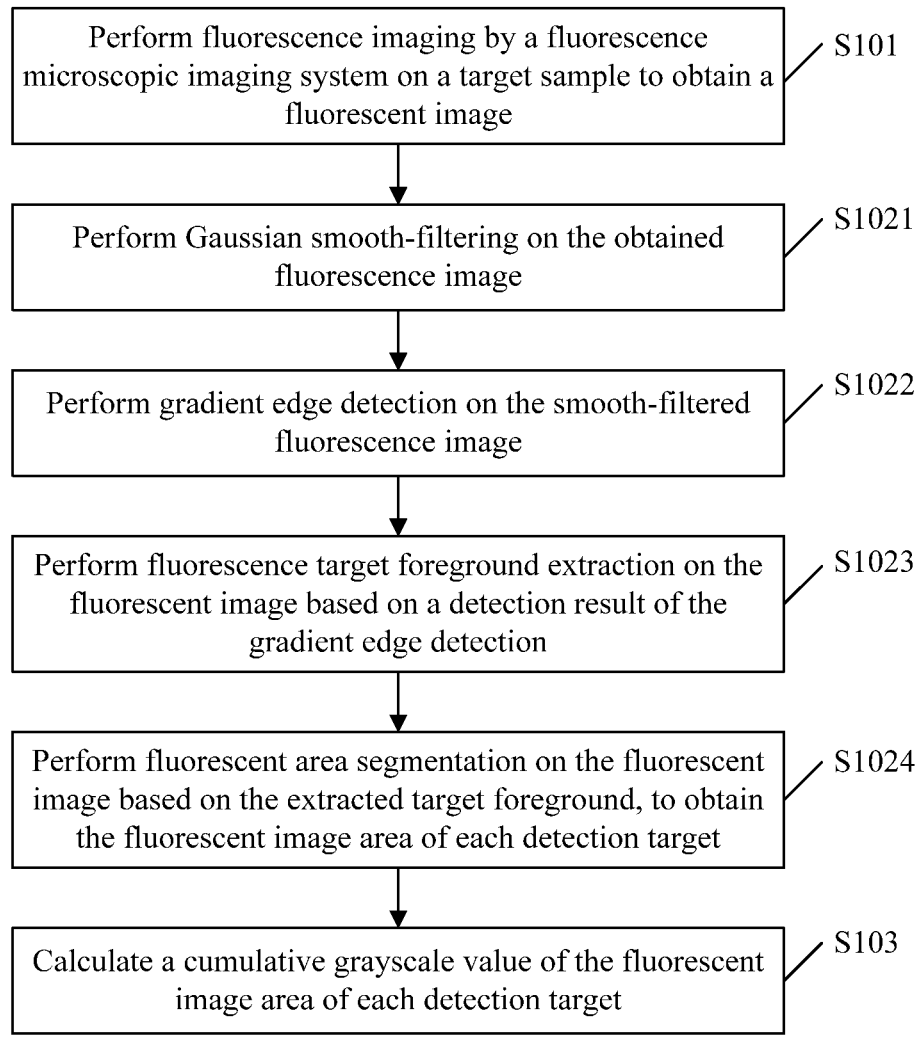
FIG. 2 is a flow chart of an intelligent recognition process in a method for determining fluorescence intensity of a fluorescence image according to an embodiment of the present disclosure.

In the above embodiment of the present disclosure, an intelligent recognition system may be used to perform intelligent recognition on the fluorescent image obtained by performing fluorescence imaging on the target sample, and obtain the fluorescent image area of each detection target by performing edge extraction and segmentation on each detection target in the fluorescence image. Referring to FIG. 2, the processing may include the following steps S1021 to S1024.

In step S1021, Gaussian smooth-filtering is performed on the obtained fluorescence image.

In this step, Gaussian smooth-filtering is performed first on the fluorescence image, to filter out isolated noise points in the fluorescent image and smooth the edge of the fluorescent image, so as to facilitate subsequent extraction and determination of the edge.

In step S1022, gradient edge detection is performed on the smooth-filtered fluorescence image.

In this step, gradient edge detection is performed on the filtered fluorescence image mainly by using a grayscale image corresponding to the filtered fluorescence image to calculate gradient features of the fluorescence image, and separating a to-be-recognized foreground target area from the background target according to magnitudes of edge gradients.

In step S1023, fluorescence target foreground extraction is performed on the fluorescent image based on the detection result of the gradient edge detection.

In this step, target foreground extraction is performed on the foreground detection area obtained in step S202, by tracking the edge to mark the to-be-recognized foreground target areas one by one according to attributes of the connected area and record the position of the edge.

In step S1024, fluorescent area segmentation is performed on the fluorescent image based on the extracted target foreground to obtain the fluorescent image area of each detection target.

After the processing in step S1023 is completed, it is inevitable to have a large number of overlapping detection targets. Therefore it is required to separate the overlapping detection targets. In this step, the edge may be marked by using a series of algorithms such as distance transformation, so as to separate the individual detection targets to obtain a fluorescent image area of each detection target.

In another embodiment of the present disclosure, in addition to the fluorescent image of the target sample, a bright field image of the target sample is also acquired by the fluorescence imaging system. Therefore, the step of performing fluorescence imaging by the fluorescence microscopic imaging system on the target sample to obtain a fluorescent image in the above method may be acquiring a fluorescent image and a bright field image of the target sample by the fluorescence microscopic imaging system. In this case, before performing Gaussian smooth-filtering on the fluorescence image, the following steps S1011 to S1014 may be included.

In step S1011, a bright field target in the bright field image is recognized by using the bright field recognition technology, and an aggregation area in the recognized bright field target is segmented to obtain position and size information of each detection target in the bright field image.

Specifically, in this step, a foreground image is separated from the background target in the captured bright field image. In an example, a gray-scaling process, a brightness unifying process, an image enhancement process, and a binarizing process on the bright field image to extract a foreground detection target image from the background target. In the extracted foreground detection target image, there are a large number of aggregation areas, in which multiple detection target images are overlapped. It is required to separate the detection target images to obtain individual detection target images. Then an edge of each detection target image is acquired and the edge information is recorded.

In step S1012, the position and size information of the detection target obtained by using the bright field recognition technology are compared with a corresponding area in the fluorescent image, and the fluorescent image is recognized, and it is determined whether the area in the fluorescent image corresponding to the position and size information of any detection target in the bright field image is empty. If the area in the fluorescent image corresponding to the position and size information of no detection target in the bright field image is empty, step S1013 is performed, and if the area in the fluorescent image corresponding to the position and size information of a detection target in the bright field image is empty, step S1014 is performed.

In step S1013, the fluorescent image area of each detection target in the fluorescent image is determined, according to the area in the fluorescent image corresponding to the position and size information of each detection target detected by the bright field image recognition technology.

In step S1014, if the area in the fluorescent image corresponding to the position and size information of a detection target in the bright field image is empty, Gaussian smooth-filtering and subsequent operations are performed on the fluorescence image.

The process of recognizing the fluorescent image may include separating the area of the fluorescent target from the background target in the captured fluorescent image by performing a gray-scaling process, a brightness unifying process, an image enhancement process, and a binarizing process on the fluorescent image, extracting the edge of the image, and marking and storing the area of the fluorescent target.

The process of bright field recognition may include: taking the area (the edge of a detection target, and recording the edge information) of each detection target in the bright field image as a mark to segment the fluorescent image using the segmentation result of the bright field image technology, and extract the area of each detection target in the fluorescent image. That is, the area of each fluorescent target in the fluorescent image corresponding to a bright field target is marked, so that the fluorescence targets are separated in one-to-one correspondence to the bright field targets.

In the above embodiment, the fluorescent image and the bright field image of the target sample are acquired by a fluorescence microscopic imaging system. A specific processing includes: acquiring the fluorescent image of the target sample by the fluorescence microscopic imaging system, determining whether an area of the target sample in the obtained fluorescent image satisfies a predetermined condition, and if the area of the target sample in the obtained fluorescent image does not satisfy the predetermined condition, acquiring the bright field image of the target sample by the fluorescence microscopic imaging system.

Figure 3:
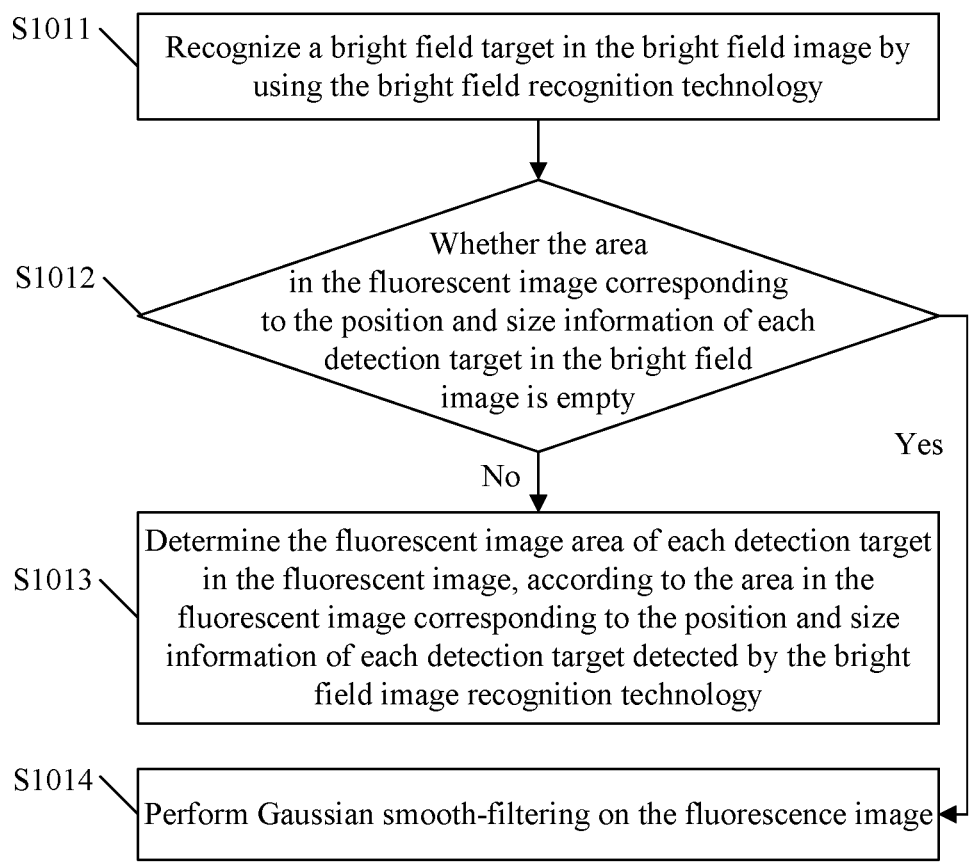
FIG. 3 is a flow chart of an intelligent recognition process in a method for determining fluorescence intensity of a fluorescence image according to another embodiment of the present disclosure.
Figure 4:
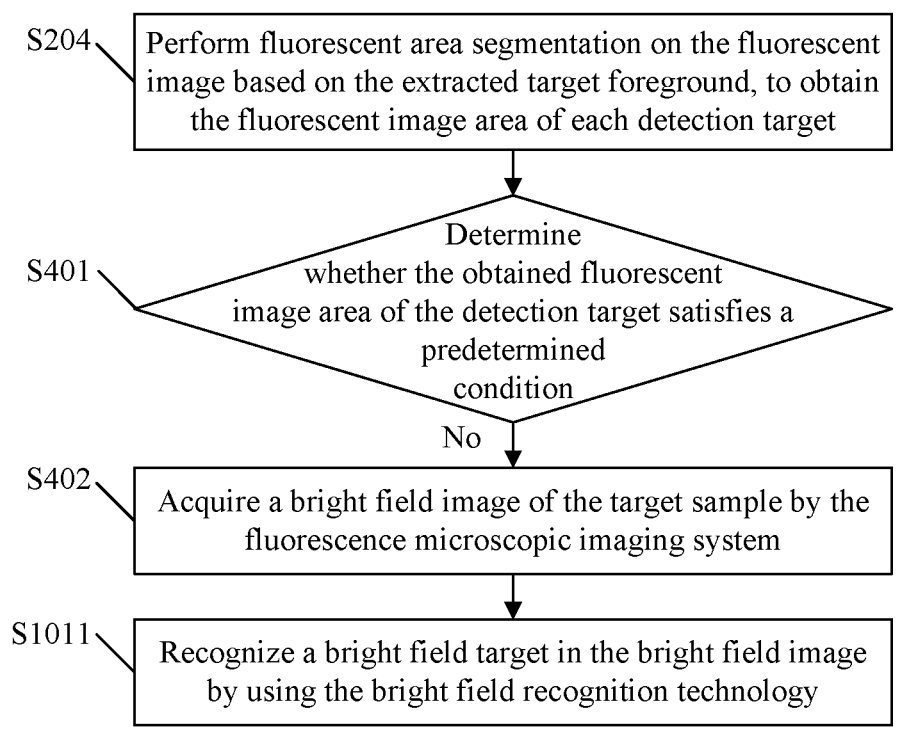
FIG. 4 is a flow chart of an intelligent recognition process in a method for determining fluorescence intensity of a fluorescence image according to another embodiment of the present disclosure.

With the method shown in FIG. 2, if the segmentation of the fluorescent target is clearly unreasonable, for example, if a clearly incorrect fluorescence area having fragmental or diffusive edges is obtained, the intelligent recognition system automatically adopts the method shown in FIG. 3 to correct the recognition, that is, recognizing based on the recognition result of the bright field target. Therefore, a method combining the intelligent recognition processing methods in the above two embodiments is provided according to the present embodiment. Referring to FIG. 4, the method adopts the process shown in FIG. 2 as a main method, and adopts the process shown in FIG. 3 as a supplementary method.

After obtaining the fluorescent image area of each detection target, the following steps S401 to S402 are further included.

In step S401, it is determined whether the obtained fluorescent image area of the detection target satisfies a predetermined condition, and if the obtained fluorescent image area of the detection target does not satisfy the predetermined condition, step S402 is performed.

In step S402, a bright field image of the target sample is acquired by the fluorescence microscopic imaging system. Then step S1011 is performed.

Figure 5:
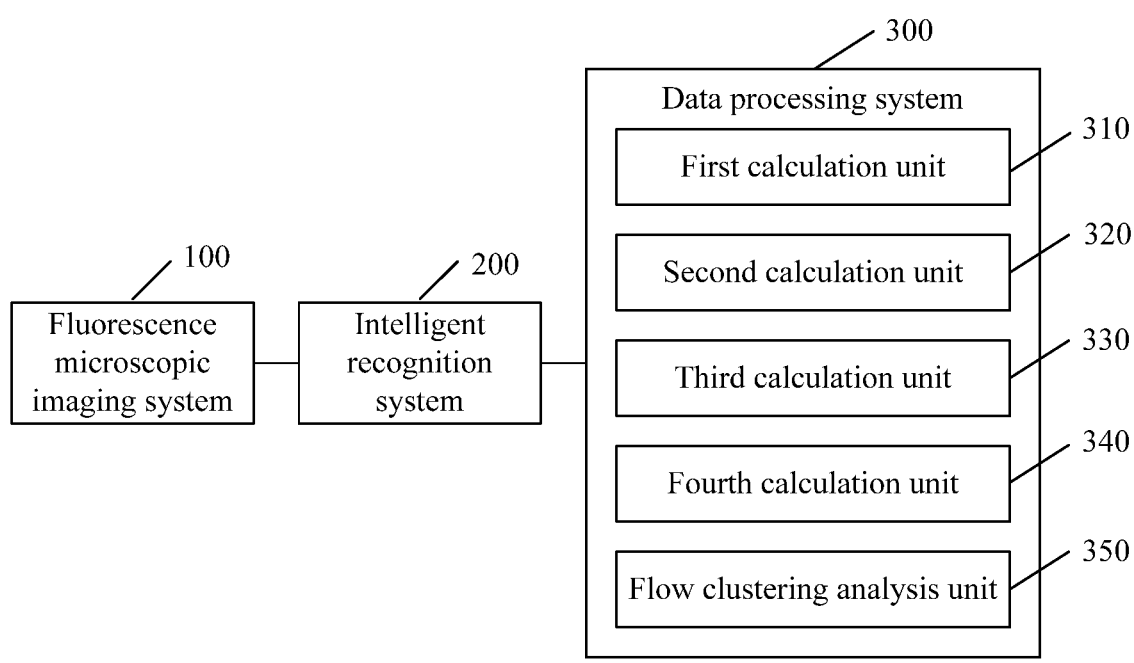
FIG. 5 is a schematic structural diagram of a system for determining fluorescence intensity of a fluorescence image according to another embodiment of the present disclosure.

Corresponding to the above method, a system for determining fluorescence intensity of a fluorescence image is further provided according to the present disclosure. The method and the system may be referred to each other. Referring to FIG. 5, the system may include: a fluorescence microscopic imaging system 100, an intelligent recognition system 200, and a data processing system 300.

The fluorescence microscopic imaging system 100 is configured to perform fluorescence imaging on a target sample.

The intelligent recognition system 200 is configured to perform edge extraction and segmentation on each detection target in the fluorescence image, to obtain the fluorescent image area of each detection target in the fluorescence image.

The data processing system 300 includes a first calculation unit 310, a second calculation unit 320, a third calculation unit 330, a fourth calculation unit 340, and a flow clustering analysis unit 350.

The first calculation unit 310 is configured to calculate a cumulative grayscale value of the fluorescent image area of each detection target, and determine the cumulative grayscale value as a cumulative fluorescence intensity value which is represented by a cumulative voltage pulse value acquired by a photomultiplier tube in a fluorescent channel in flow clustering analysis.

The second calculation unit 320 is configured to calculate a maximum grayscale value of the fluorescent image area of each detection target, and determine the maximum grayscale value as a maximum fluorescence intensity value which is represented by a maximum voltage pulse value acquired by the photomultiplier tube in the fluorescent channel in the flow clustering analysis.

The third calculation unit 330 is configured to calculate an average grayscale value of the fluorescent image area of each detection target, and determine the average grayscale value as an average fluorescence intensity value which is represented by an average voltage pulse value acquired by the photomultiplier tube in the fluorescent channel in the flow clustering analysis.

The fourth calculation unit 340 is configured to calculate a diameter value of a bright field image area of each detection target as a target size value, and determine the target size value as a substitutive index value for a detection target size value represented by a voltage pulse value acquired by the photomultiplier tube in a forward scattering channel in the flow clustering analysis.

The flow clustering analysis unit 350 is configured to perform the flow clustering analysis based on the cumulative grayscale value, the maximum grayscale value, the average grayscale value, and the bright field diameter value.

Corresponding to the above method, the system for determining fluorescence intensity of a fluorescence image may include at least one of the first calculation unit 310, the second calculation unit 320, the third calculation unit 330, and the fourth calculation unit 340. That is, the system may optionally include the first calculation unit 310, the second calculation unit 320, the third calculation unit 330, and/or the fourth calculation unit 340.

Corresponding to the above method, the intelligent recognition system 200 is configured to perform an intelligent recognition process on the fluorescent image, to extract an edge of each detection target in the fluorescent image. All pixels in the area enclosed by the edge form the fluorescent image area of the individual detection target.

Corresponding to the above method, the intelligent recognition system 200 includes at least a fluorescent target extraction unit. The fluorescent target extraction unit includes: a filtering unit, a gradient detection unit, a foreground extraction unit, and a segmentation unit.

The filtering unit is configured to perform Gaussian smooth-filtering on the fluorescence image.

The gradient detection unit is configured to perform gradient edge detection on the smooth-filtered fluorescence image.

The foreground extraction unit is configured to perform fluorescence target foreground extraction on the fluorescent image based on a detection result of the gradient edge detection.

The segmentation unit is configured to perform fluorescent area segmentation on the fluorescent image based on an extracted fluorescence target foreground, to obtain the fluorescent image area of each detection target.

Corresponding to the above method, the fluorescence microscopic imaging system 100 is further configured to acquire a bright field image of the target sample.

The intelligent recognition system 200 may further include a bright field cell separation system. The bright field cell separation system may include a bright field recognition unit and a bright field cell separation unit.

The bright field recognition unit is configured to recognize a bright field target in the bright field image, and segment an aggregation area in the recognized bright field target, to obtain position and size information of each detection target in the bright field image.

The bright field cell separation unit is configured to determine whether an area in the fluorescent image corresponding to the position and size information of any detection target in the bright field image is empty, determine, if the area in the fluorescent image corresponding to the position and size information of no detection target in the bright field image is empty, the fluorescent image area of each detection target in the fluorescent image, according to the obtained area corresponding to the position and size information of each detection target in the bright field image, and output, if the area in the fluorescent image corresponding to the position and size information of a detection target in the bright field image is empty, a trigger signal to a fluorescent target for triggering an operation of the fluorescent target.

Corresponding to the above method, the fluorescence microscopic imaging system is further configured to acquire a bright field image of the target sample according to another embodiment of the present disclosure.

The intelligent recognition system 300 includes a fluorescent target extraction unit and a bright field cell separation system. The operation timing of the fluorescence target and the bright field cell separation system in the present embodiment is different from that in the above embodiment.

In the present embodiment, the fluorescent target further includes a determining unit. The determining unit is configured to determine whether an obtained fluorescent image area of a cell satisfies a predetermined condition, and if the obtained fluorescent image area of the cell does not satisfy the predetermined condition, the fluorescence microscopic imaging system to acquire the bright field image of the target sample and output a trigger signal to the bright field cell separation system.

For the convenience of description, the above system is described as various modules with different functions. Apparently, the functions of the various modules may be implemented in the same or different software and/or hardware.

It should be noted that, in the present specification, the embodiments are described in a progressive manner, and reference can be made to each other for similar parts among the embodiments. Each embodiment mainly focuses on an aspect different from other embodiments. In particular, the system disclosed in the embodiment corresponds to the method disclosed in the embodiment, and thus is described relatively simply. For detailed description of the system, reference may be made to the related description of the method. The description of the system or system embodiment is only illustrative. That is, units described as separated components may be or may not be separated physical units. A component displayed as a unit may be or may not be a physical unit, that is, it may be placed in a same position or may be distributed in multiple network units. A part of or all modules may be selected as required to realize the object of the embodiments. Those skilled in the art can understand and implement the embodiments without any creative work.

It may be known by those skilled in the art that, exemplary units and steps described in conjunction with the embodiments disclosed herein can be realized by electronic hardware, computer software or a combination thereof. In order to clearly illustrate interchangeability between the hardware and the software, steps and composition of each embodiment have been described generally in view of functions in the above description. Whether the function is executed in hardware or in software depends on applications of the technical solution and design constraint conditions. Those skilled in the art can use different methods for different applications to realize the described functions, which are not considered to be beyond the scope of the present disclosure.

The steps of the methods or algorithms described in conjunction with the embodiments of the present disclosure can be implemented with hardware, software modules executed by a processor, or a combination thereof. The software modules may reside in a Random Access Memory (RAM), a memory, a Read Only Memory (ROM), an Electrically Programmable ROM, an Electrically-Erasable Programmable ROM, a register, a hard disk, a removable disk drive, a CD-ROM, or other types of storage media well known in the technical field.

It should be noted that, in this context, relational terms such as first and second are used merely to distinguish one entity or operation from another entity or operation, and do not necessarily require or imply any such actual relationship or order between these entities or operations. The term "including", "comprising" or any other variations thereof are intended to cover a non-exclusive inclusion, thus a process, method, item or apparatus including a series of elements includes not only those elements, but also other elements not explicitly listed, or elements inherent to such a process, method, item or apparatus. Without further limitation, an element defined by the phrase "including a . . . " does not exclude the existence of additional identical elements in the process, method, article or apparatus including the element.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A method for determining fluorescence intensity of a fluorescence image, comprising:
    performing fluorescence imaging, by a fluorescence microscopic imaging system, on a target sample to obtain a fluorescent image;

performing edge extraction and segmentation on each detection target in the fluorescence image, to obtain the fluorescent image area of each detection target in the fluorescence image;

performing at least one of operations of:

calculating a cumulative grayscale value of the fluorescent image area of each detection target, and determining the cumulative grayscale value as a cumulative fluorescence intensity value which is represented by a cumulative voltage pulse value acquired by a photomultiplier tube in a fluorescent channel in flow clustering analysis;

calculating a maximum grayscale value of the fluorescent image area of each detection target, and determining the maximum grayscale value as a maximum fluorescence intensity value which is represented by a maximum voltage pulse value acquired by the photomultiplier tube in the fluorescent channel in the flow clustering analysis;

calculating an average grayscale value of the fluorescent image area of each detection target, and determining the average grayscale value as an average fluorescence intensity value which is represented by an average voltage pulse value acquired by the photomultiplier tube in the fluorescent channel in the flow clustering analysis; and calculating a bright field diameter value of a bright field image area of each detection target as a target size value, and determining the target size value as a substitutive index value for a detection target size value represented by a voltage pulse value acquired by the photomultiplier tube in a forward scattering channel in the flow clustering analysis; and performing the flow clustering analysis based on at least one of the cumulative grayscale value, the maximum grayscale value, the average grayscale value, and the bright field diameter value.

2. The method for determining fluorescence intensity of a fluorescence image according to claim 1, wherein the performing the flow clustering analysis based on at least one of the cumulative grayscale value, the maximum grayscale value, the average grayscale value, and the bright field diameter value, comprises:

searching a predetermined mapping table for a cumulative fluorescence intensity value, a maximum fluorescence intensity value, an average fluorescence intensity value, and a target size value respectively corresponding to the cumulative grayscale value, the maximum grayscale value, the average grayscale value, and the bright field diameter value, and performing the flow clustering analysis based on the cumulative fluorescence intensity value, the maximum fluorescence intensity value, the average fluorescence intensity value, and the target size value obtained by the searching.

3. The method for determining fluorescence intensity of a fluorescence image according to claim 1, wherein the performing edge extraction and segmentation on each detection target in the fluorescence image, comprises:

performing Gaussian smooth-filtering on the fluorescence image;

performing gradient edge detection on the smooth-filtered fluorescence image;

performing fluorescence target foreground extraction on the fluorescence image based on a detection result of the gradient edge detection; and performing fluorescent area segmentation on the fluorescent image based on an extracted fluorescence target foreground, to obtain the fluorescent image area of each detection target.

4. The method for determining fluorescence intensity of a fluorescence image according to claim 3, wherein the performing fluorescence imaging, by a fluorescence microscopic imaging system, on a target sample to obtain a fluorescent image comprises:

acquiring the fluorescent image and a bright field image of the target sample by the fluorescence microscopic imaging system, and before the performing Gaussian smooth-filtering on the fluorescence image, the method further comprises:

recognizing a bright field target in the bright field image and segmenting an aggregation area in the recognized bright field target, to obtain position and size information of each detection target in the bright field image, recognizing the fluorescent image, and determining whether an area in the fluorescent image corresponding to the position and size information of any detection target in the bright field image is empty, determining, if the area in the fluorescent image corresponding to the position and size information of no detection target in the bright field image is empty, the fluorescent image area of each detection target in the fluorescent image, according to the obtained area corresponding to the position and size information of each detection target in the bright field image, and turning, if the area in the fluorescent image corresponding to the position and size information of a detection target in the bright field image is empty, to performing the Gaussian smooth-filtering and subsequent operations on the fluorescence image.

5. The method for determining fluorescence intensity of a fluorescence image according to claim 4, wherein the acquiring a fluorescent image and a bright field image of the target sample by the fluorescence microscopic imaging system comprises:

acquiring the fluorescent image of the target sample by the fluorescence microscopic imaging system;

determining whether an area of the target sample in the obtained fluorescent image satisfies a predetermined condition, and acquiring, if the area of the target sample in the obtained fluorescent image does not satisfy the predetermined condition, the bright field image of the target sample by the fluorescence microscopic imaging system.

6. A system for determining fluorescence intensity of a fluorescence image, comprising:

a fluorescence microscopic imaging system, configured to perform fluorescence imaging on a target sample;

an intelligent recognition system, configured to perform edge extraction and segmentation on each detection target in the fluorescence image, to obtain the fluorescent image area of each detection target in the fluorescence image;

a data processing system, comprising at least one of a first calculator, a second calculator, a third calculator, and a fourth calculator, and comprising a flow clustering analyzer, wherein the first calculator is configured to calculate a cumulative grayscale value of the fluorescent image area of each detection target, and determine the cumulative grayscale value as a cumulative fluorescence intensity value which is represented by a cumulative voltage pulse value acquired by a photomultiplier tube in a fluorescent channel in flow clustering analysis, the second calculator is configured to calculate a maximum grayscale value of the fluorescent image area of each detection target, and determine the maximum grayscale value as a maximum fluorescence intensity value which is represented by a maximum voltage pulse value acquired by the photomultiplier tube in the fluorescent channel in the flow clustering analysis, the third calculator is configured to calculate an average grayscale value of the fluorescent image area of each detection target, and determine the average grayscale value as an average fluorescence intensity value which is represented by an average voltage pulse value acquired by the photomultiplier tube in the fluorescent channel in the flow clustering analysis, the fourth calculator is configured to calculate a diameter value of a bright field image area of each detection target as a target size value, and determine the target size value as a substitutive index value for a detection target size value represented by a voltage pulse value acquired by the photomultiplier tube in a forward scattering channel in the flow clustering analysis, and the flow clustering analyzer is configured to perform the flow clustering analysis based on at least one of the cumulative grayscale value, the maximum grayscale value, the average grayscale value, and the bright field diameter value.

7. The system for determining fluorescence intensity of a fluorescence image according to claim 6, wherein the flow clustering analyzer is configured to search a predetermined mapping table for a cumulative fluorescence intensity value, a maximum fluorescence intensity value, an average fluorescence intensity value, and a target size value respectively corresponding to the cumulative grayscale value, the maximum grayscale value, the average grayscale value, and the bright field diameter value, and perform the flow clustering analysis based on the searched cumulative fluorescence intensity value, maximum fluorescence intensity value, average fluorescence intensity value, and target size value.

8. The system for determining fluorescence intensity of a fluorescence image according to claim 6, wherein the intelligent recognition system comprises at least a fluorescent target exactor, and the fluorescent target extractor comprises:

a filter, configured to perform Gaussian smooth-filtering on the fluorescence image, a gradient detector, configured to perform gradient edge detection on the smooth-filtered fluorescence image, a foreground extractor, configured to perform fluorescence target foreground extraction on the fluorescent image based on a detection result of the gradient edge detection, and a segmentor, configured to perform fluorescent area segmentation on the fluorescent image based on an extracted fluorescence target foreground, to obtain the fluorescent image area of each detection target.

9. The system for determining fluorescence intensity of a fluorescence image according to claim 8, wherein the fluorescence microscopic imaging system is further configured to acquire a bright field image of the target sample, and the intelligent recognition system further comprises a bright field cell separation system, and the bright field cell separation system comprises:

a bright field recognizer, configured to recognize a bright field target in the bright field image, and segment an aggregation area in the recognized bright field target, to obtain position and size information of each detection target in the bright field image, and a bright field cell separator, configured to determine whether an area in the fluorescent image corresponding to the position and size information of any detection target in the bright field image is empty, determine, if the area in the fluorescent image corresponding to the position and size information of no detection target in the bright field image is empty, the fluorescent image area of each detection target in the fluorescent image, according to the obtained area corresponding to the position and size information of each detection target in the bright field image, and output, if the area in the fluorescent image corresponding to the position and size information of a detection target in the bright field image is empty, a trigger signal to the fluorescent target extractor for triggering an operation of the fluorescent target extractor.

10. The system for determining fluorescence intensity of a fluorescence image according to claim 9, wherein the fluorescent target extraction unit further comprises:

a determiner, configured to determine whether an obtained fluorescent image area of a cell satisfies a predetermined condition, and if the obtained fluorescent image area of the cell does not satisfy the predetermined condition, control the fluorescence microscopic imaging system to acquire the bright field image of the target sample and output a trigger signal to the bright field cell separation system.

* * * * *